Figure 1:

Feb. 15, 1966   HANS-JOACHIM DIETZSCH   3,234,639
METHOD OF MAKING A FILTER
Filed Sept. 24, 1962                                4 Sheets-Sheet 1

Inventor:
Hans-Joachim Dietzsch
by
Michael S. Striker

Feb. 15, 1966 HANS-JOACHIM DIETZSCH 3,234,639

METHOD OF MAKING A FILTER

Filed Sept. 24, 1962 4 Sheets-Sheet 2

Inventor:
Hans-Joachim Dietzsch
by Michael S. Striker

Feb. 15, 1966    HANS-JOACHIM DIETZSCH    3,234,639
METHOD OF MAKING A FILTER
Filed Sept. 24, 1962    4 Sheets-Sheet 3

Inventor:
Hans-Joachim Dietzsch
by Michael S. Striker
Atty

Inventor:
Hans-Joachim Dietzsch
by Michael J. Striker 3,234,639
METHOD OF MAKING A FILTER
Hans-Joachim Dietzsch, Chemin de Bonne Esperance 10, Lausanne, Switzerland
Filed Sept. 24, 1962, Ser. No. 225,916
Claims priority, application Germany, Sept. 25, 1961, D 37,112; Jan. 20, 1962, D 37,967
13 Claims. (Cl. 29—411)

This invention relates to a method of making a filter, particularly for the separation of fine particles from liquids or gases, for instance for harvesting plankton from seawater. The filter more especially contemplated by the invention is a high efficiency filter which will not become choked. The invention also concerns methods of producing filters of the specified kind.

The filter consists of a large number of straight, parallel, closely packed capillary ducts which are open at both ends and have parallel walls, so arranged that the openings at one end of the capillary ducts define a continuous surface and that the capillary walls at said end converge towards the said surface. It is preferred that only the latter ends of the capillaries should be connected together. The filter may be formed from numerous similar structural elements having relatively parallel surfaces packed closely together in parallel and of suitable shape to form the capillary ducts. The capillaries of the filter may thus be formed by tubes connected or bonded together at least at one of their ends at which their walls thicken and constrict the capillary openings. Alternatively they may be formed by numerous closely packed corrugated bands connected or bonded together at least at one of their ends or by closely spaced parallel bands with interposed spacing strips, likewise connected or bonded together at least at one of their ends. Preferably the capillary walls are thickened at the said ends to constrict the relative capillary openings and also to connect the surrounding neighbouring capillaries tightly together.

The invention is particularly suited for filters with capillaries having diameters between a few hundredths and a few tenths of a millimetre, the filters as such being between a few tenths of a millimetre and a few millimetres in thickness.

A particularly useful arrangement for association with such a filter is a scraper device with an edge adapted to sweep across the smooth filter surface.

The constriction at the ends of the capillary ducts may be formed in various ways. For instance a large number of structural elements (e.g. tubes, bands or the like) of a length equal to a multiple of the thickness of the filters required may be assembled into a pack and the surface of said pack in which the capillary openings lie subjected to a suitable treatment for constricting the capillary ends at said openings, a surface layer of suitable thickness being sliced off for the length of the capillary ducts in the slice to exceed the length of the constriction, the procedure being repeated and a plurality of filters thus cut off the pack. The elements of the filter may consist of a material which softens when heated so that the constriction of the capillary ends and the bonding together of the structural elements may be performed by compression, preferably with the simultaneous application of heat to the surface of the pack thus contrived. However, it will be readily understood that the constriction of the capillary ends may be effected in some alternative way, for instance by the application thereto of a substance which firmly adheres to the structural elements, for example by the electrodeposition of metal.

Figure 2:
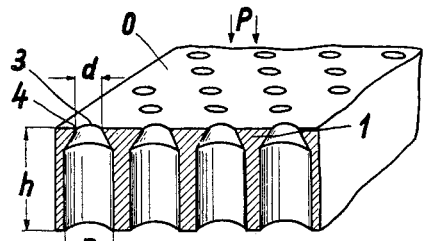
Figure 3:
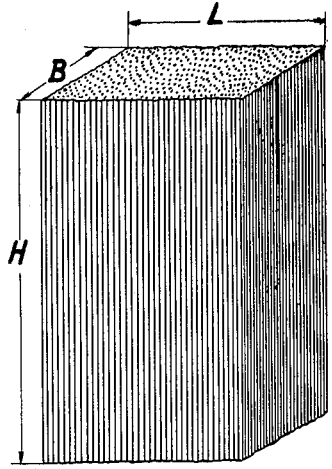
Figure 4:
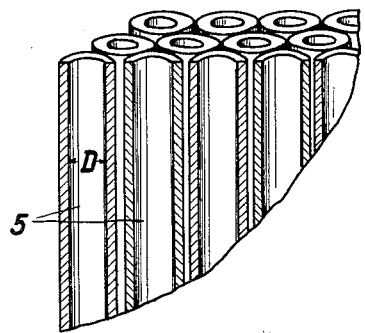
Figure 5:
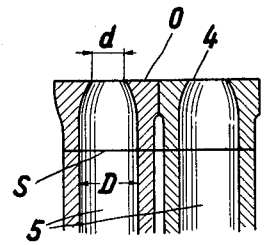
Figure 6:
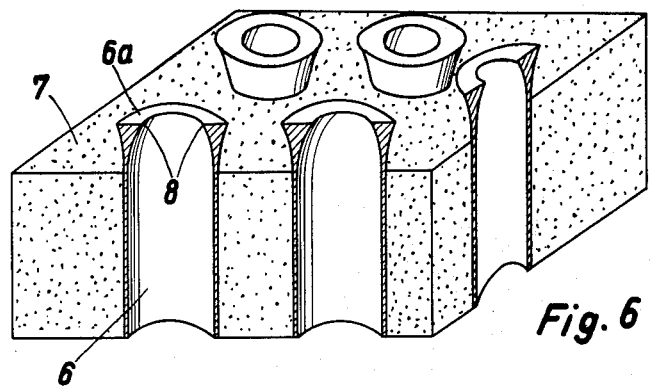
Figure 7:
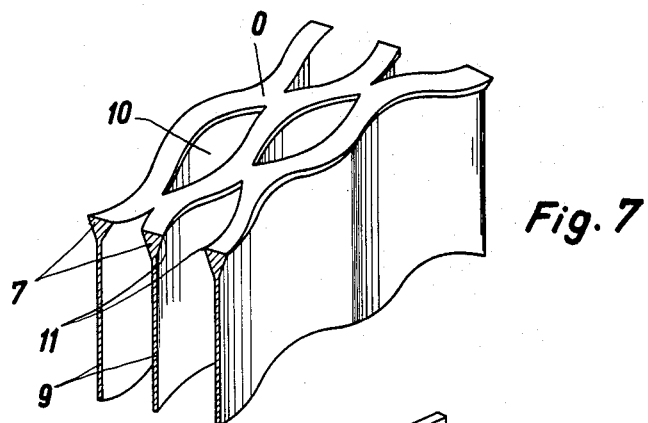
Figure 8:
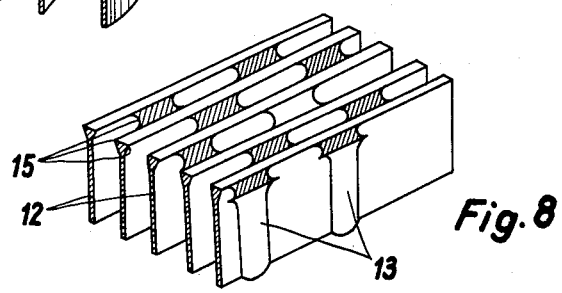
Figure 10:
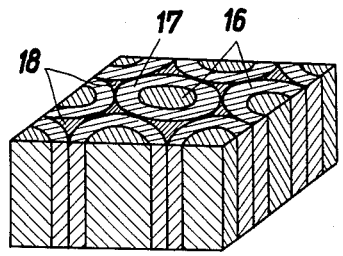
Figure 9:
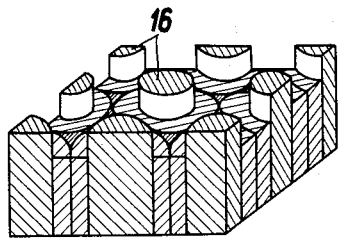
Figure 11:
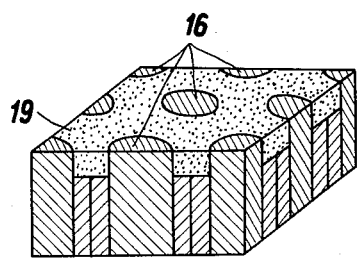
Figure 12:
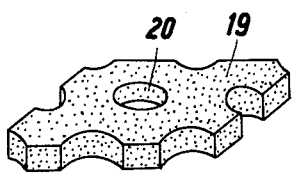
Figure 13:
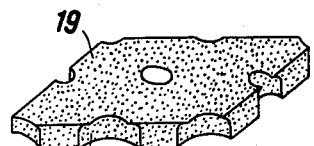
Figure 14:
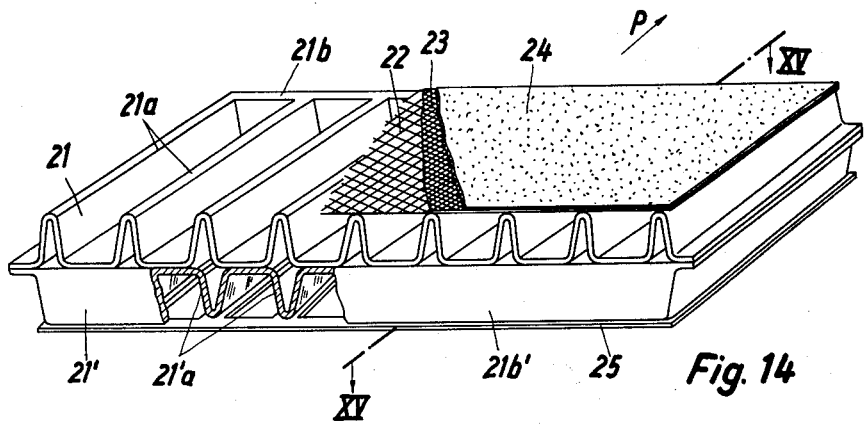
Figure 15:
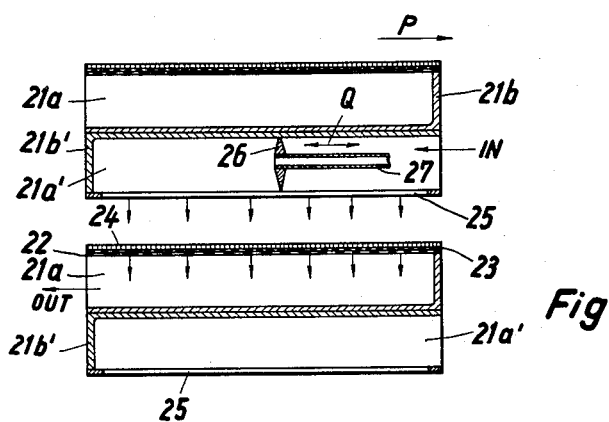
Figure 16:
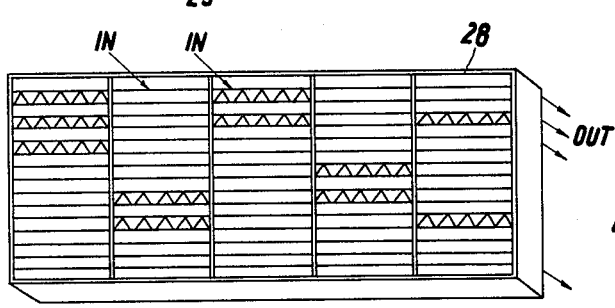

Embodiments of the invention will now be illustratively described in greater detail by reference to the accompanying drawings in which FIG. 1 is a perspective view of a filter of the kind proposed by the invention, FIG. 2 is a fragmentary view of the filter, shown on a larger scale, FIG. 3 represents a pack of tubes, as may be used for the production of filters according to the invention, FIG. 4 is an enlarged part sectional perspective view of the pack of tubes shown in FIG. 3, FIG. 5 shows two of the tubes illustrated in FIG. 4 after these have been subjected to a thermal treatment, FIGS. 6, 7 and 8 are similarly enlarged fragmentary part sectional views of filters according to the present invention, FIGS. 9 to 11 illustrate a template for producing a filter according to the invention, FIG. 12 is a filter element produced in the manner illustrated in FIGS. 9 to 11, FIG. 13 is the completed filter, FIG. 14 is a filter according to the invention mounted on suitable holder, FIG. 15 is a section taken on the line XV—XV in FIG. 14, two such sections being shown one above the other, FIG. 16 is a frame for a major number of filter holders according to FIGS. 14 and 15, shown on a smaller scale.

The filter illustrated in FIGS. 1 and 2 consists of a body 1 of solid material traversed by numerous parallel capillary ducts 2 of diameter D. At one end these ducts are reduced in diameter, their openings 3 at this end having a smaller diameter $d$. These openings 3 are all located in a common plane which forms the flat upper surface O of the filter. The diameter at the ends of the ducts 2 is reduced in that the walls at the ends of the ducts converge to form sharp cutting edges 4 where the ducts form openings in surface O of the filter. The angle of convergence towards the duct axis may be between 30 and 60°. The diameter $d$ should be at least 10% shorter than diameter D. Diameter D may be between a few hundredths to a few tenths of a millimetre. However, the invention is by no means intended to be limited to the stated dimensions. Filters having openings of such a size are merely especially suitable for filtering particles out of liquids, for instance for separating plankton from seawater.

The filtered medium enters the filter shown in FIGS. 1 and 2 from above in the direction of arrow P, so that the liquid can pass through the openings 2, whereas the separated material is retained on the smooth surface O. This material can then be easily removed from surface O by a scraper or brush or alternatively it may be washed off with a jet of liquid or the like. The sharp edges 4 favour a clean removal of the layer of material which collects on surface O. Any residual material which may remain in the openings 3 will be washed down into the wider part of the ducts 2 when further medium is passed through the filter, thus clearing the openings on the surface immediately for further filtering action. Moreover, the edge of the scraper cooperates with the sharp edges of the openings in the manner of a knife and a counterknife. In case the filter surface is cleaned by a scraper which works only in one direction it may be sufficient to provide the capillary openings with sharp edges 4 on only one side.

Filter bodies of the kind illustrated in FIGS. 1 and 2 can be produced in various ways.

FIGS. 3 to 5 illustrate one such method in which a large number of tubes 5 consisting of a suitable synthetic material, such as polyethylene, an acetal resin or cellulose acetobutyrate, are packed together in parallel to form a rectangular block, as illustrated on a smaller scale in FIG. 3 and on a larger scale in FIG. 4. The internal diameter D of the tubes may be between a few hundredths to a few tenths of a millimetre and the tubes may have a length of one metre, the block shown in FIG. 3 having a height H of 1 metre, a length L of say 40 cms. and a width B of say 10 cms. Since the tubes are packed closely together they will be in contact at certain points of their peripheries, whereas at others some clearance will remain in-between them. This is indicated in FIG. 4. The disposition of the tubes is such that one end of all the tubes lies in a common plane. This can be achieved by making a cut across the end of all the tubes in the pack. In FIGS. 3 and 4 the ends of the tubes are located in a plane normal to their individual axes. Although this may be a convenient arrangement in many cases, there is no reason why the cut should not be inclined. Moreover, the ends of the packed tubes might also be arranged to define a curved surface, such as a cylindrical surface.

For producing filter bodies according to the invention the ends of the bunched tubes defining the plane or otherwise shaped surface are heated until they are plastic and they are then subjected to a compressional load. This causes the edges of the tubes to be thickened inside and out, as indicated in FIG. 5. Also, the outside faces of the tube ends are fused together. At the same time their internal diameter D is reduced to the smaller diameter $d$. The constriction of the inside of the tubes may be such that the tube walls make an acute angle with surface O, thus forming a sharp edge. If the desired sharp edge cannot be satisfactorily achieved by heating and compression, surface O may be subsequently ground. The desired deformation of the capillary ends may be effected in alternative ways, for instance by cold upsetting, wiring or one-sidedly deforming the capillary walls. For achieving a very smooth overall surface O a thin foil of a sufficiently heat-resistant material, for instance of metal or a suitable plastic, such as terephthalic acid ester or cellulose, may be placed over the surface of the packed tubes before they are heated and the foil briefly pressed down with a hot plate at appropriate temperature or a pressing iron may be run over the foil with the application of suitable pressure. The foil can then be peeled off to reveal a surface which is as smooth as a mirror and the openings of the tubes in this surface will be found to be reduced in diameter as is required. A thin section is then sliced off the cooled block, for instance with the help of a microtome, in such manner that the section cuts through the tubes where their walls have not been deformed by the endwise compression. In FIG. 5 this cutting line is indicated by S. When this section, representing the finished filter, has been removed the remainder of the block formed by the pack of tubes can be treated again in a similar way. From a block formed from tubes which are 1 metre long and 0.1 mm. in diameter, with a wall thickness of 0.01 mm. or less, several thousand filters can thus be produced.

In an alternative procedure the tubes in a pack may be bonded together along the whole of their length. In the arrangement illustrated in FIG. 6 glass tubes 6 are encast in a plastic matrix 7 consisting for instance of polymethacrylate. The surface of the plastic 7 is then removed by dissolving a thin surface layer away with a chlorinated hydrocarbon. A very bright platinum foil is then placed on to the projecting ends of the tubes 6 and a red hot pressing iron is briefly applied to the same. The ends 6a of the walls of the glass tubes are thereby flared out and their edges are smoothed, whereas the internal diameter of the tube ends is reduced and sharp cutting edges 8 are formed.

The filter shown in FIG. 7 is built up from corrugated bands 9 placed closely together in parallel with the crests of the corrugations in contact. Two such bands 9 will thus enclose longitudinal ducts 10 between the lines along which they contact. The inner cross section of these ducts 10 is then reduced at one end—in a manner analogous to that described in connection with the circular ducts 2 in FIG. 2 and the tubes 5 in FIG. 5—to produce sharp edges 11 where the channels form openings in surface O.

A plurality of corrugated bands is thus assembled to form a pack say 50 cms. in length and 1 metre in width, with an average distance of 0.1 mm. between bands which have corrugations 0.3 mm. in length, the thickness of the bands being 0.01 mm. Suitable bands can be produced for instance by electrolytically depositing an appropriate metal such as nickel on the greater part of the surface of a slowly revolving roll of suitable material, such as chrome-nickel steel, provided with small surface groovings or flutings, the electrolytically deposited plating being continuously peeled off the rotating roll at one point in the form of a continuous band.

The filter in FIG. 8 consists of parallel flat bands 12 and narrow strips 13 which ensure uniform spacing of the bands, and which are located at intervals to define narrow ducts 14 between the bands 12 and the strips 13. The cross section of these channels 14 is reduced at one end to produce edges 15 at the ends of the walls of the channels in surface O.

Filters may be produced from the material illustrated in FIGS. 7 and 8 in the same way as described by reference to FIGS. 3 to 5.

The above-mentioned process of heating the surface of a pack may also be effected by applying to the treated surface for only fractions of a second a plate at a temperature substantially above the softening point of the material of the assembly of elements of the filter. This procedure ensures that the effect of the elevated temperature in softening and deforming the elements will not penetrate deeper into the pack than is needed. This is a matter which calls for special attention if the capillary ducts are very small and the material itself has a very limited fusing temperature range.

Yet another method of producing filters according to the present invention consists in first providing a template of the kind shown in FIG. 9. This may be provided by closely bunching together in parallel a large number of round metal pins 16—FIGS. 9 to 13 represent only parts of the template and of the mouldings produced thereon—embedded in a thin sheath 17 of a metal which is easily etched away, and by bonding the assembly together by casting a metal, likewise of a kind subsequently easily dissolved away, into the remaining interstices (FIG. 10). The two metals 17 and 18 are then removed to a given depth by etching, said depth corresponding with the thickness of the filter which is required. The resultant template (FIG. 9) is then filled with a plastic 19 to the level of the ends of the pins 16 (FIG. 11). When set, the plastic moulding 19 is removed (FIG. 12) and the ends of the ducts 20 left by the pins 16 are constricted, for instance by the brief application of heat. The pins 16 of the template (FIG. 9), especially if the latter has the form of a mould, may also be suitably shaped to create ducts 20 in the plastic mass 19 which already possess the required acute cutting edges.

In filters of the afore-described kind the reduction in diameter of the duct ends may alternatively be effected by applying to the surface containing the duct openings a substance which adheres to the edges of the duct openings. For example, a synthetic resin dissolved in a volatile solvent may be sprayed on to the surface to form a smooth lacquer-like coating which enters the ends of the ducts and constricts the diameter of the openings, and which also cements together the external duct walls if these are formed by separate structural elements. Moreover, if the elements forming the filter are metal—a metal deposit may be electrolytically precipitated on to the surface to constrict the openings in a similar way. The surface may be finally smoothed by grinding and polishing.

In order to support filters of the afore-described kind and to permit a plurality of filters to be simultaneously used holders may be employed in the form illustrated in FIGS. 14 to 16. The holder shown in FIG. 14 consists of two similar parts 21 and 21' each in the form of a plate with projecting parallel ribs 21a and 21a' and a cross wall 21b and 21b' at one end of the ribs. These two parts 21 and 21' may be of plastic construction. They are firmly connected together with the rib members projecting in parallel towards opposite sides and the cross walls 21b and 21b' on opposite sides of the width of the holder. The ribs 21a support a coarse mesh metal fabric 22 which in turn bears a fine metal mesh 23 for supporting a filter 24 according to the invention. Another filter assembly of the kind shown in FIG. 14 is placed on to filter 24 in the manner indicated in FIG. 15. A rubber seal 25 preferably adhesively affixed to the underside of part 21' is interposed between filter 24 and the upper holder. The spacing of the ribs 21a is preferably equal to about $\frac{1}{10}$ to $\frac{1}{100}$ of their length.

This appliance is moved through the liquid which is to be filtered in the direction indicated by arrow P. The liquid therefore enters part 21' in the direction indicated by the arrow marked IN and is then forced downwards through filter 24 into the cavities formed by parts 21 underneath, whence it returns to the bulk of the liquid in the direction of the arrow marked OUT. Owing to the relatively close spacing of the ribs 21a and 21a' and to the presence of the wire mesh screens 22 and 23 the filter remains flat even if the flow of liquid is fairly rapid. A uniform filtering effect is achieved and relatively low loads are imposed on the filter. A scraper may be used to remove the material which has been retained on the filter. FIG. 15 illustratively shows such a scraper 26 which can be introduced when the filtering process has been completed, the scraper bearing against the wall of part 21' and being guided by a tube 27 through which the dislodged material accumulating in front of the head of the scraper 26 can emerge when the scraper moves in the direction of arrow Q.

Assemblies of the kind illustrated in FIGS. 14 and 15 are built in stacked tiers into a frame 28 in apparatus as shown in FIG. 16. The frame is dragged through the liquid, for instance for harvesting plankton it is dragged through the sea, in such a way that the liquid can enter as indicated by the arrows marked IN and leave as indicated by the arrows marked OUT.

A single frame 28 may contain stacked tiers comprising up to several hundred assemblies of the kind shown in FIGS. 14 and 15, the length of the ribs 21a, 21a' being several metres, say 10 metres, and as many assemblies according to FIGS. 14 and 15 being placed side by side as will fill a frame 28 many metres in length, say 20 to 50 metres in length. The overall filtering surface thus provided may, in order of magnitude, be several ten thousands of square metres.

Filters according to the present invention are suitable for extracting finely divided substances from liquids or gases as well as for cleaning liquids and gases by removing finely divided impurities suspended therein. Shape, material and application of these filters may be modified and adapted to suit existing conditions and purposes. More particularly, the cross section, length and shape of the capillary ducts may be varied within very wide limits. Suitable materials for making the filters are numerous solids, such as metals, glass, ceramic materials and synthetic resins (plastics). The filters may be combined with other devices for screening, purifying, crushing and so forth. Occasionally the yield may be improved by locating a body parallel to the filter surface and by applying opposed electric potentials to this body and to the filter.

What I claim is:

1. A method of forming a filter having a smooth end face and a large number of closely adjacent substantially parallel capillary ducts having end portions tapering toward said end face, comprising the steps of bunching together into a pack a large number of like structural elements in parallel to form between said elements a large number of parallel capillary ducts, said elements having each a length corresponding to many times the thickness of a filter with the ends of said elements on top of said pack arranged substantially along a common surface; bonding said elements together; subjecting the surface at the top of the pack to a treatment for constricting the openings of said capillary ducts; cutting off from the top of said pack a section of a thickness greater than the length of the constricted ends of said capillary ducts; and repeating the aforementioned steps until the entire pack is cut into sections for forming filters.

2. A method as claimed in claim 1 in which the structural elements of the pack are simultaneously bonded together by the treatment applied to the surface of the top of the pack for the purpose of constricting the capillary ends.

3. A method as claimed in claim 2, which comprises using structural elements consisting of a material which can be softened by the application of heat, and in which the treatment for constricting the capillary ends and for bonding the structural elements together consists in the application of a suitable amount of heat to the surface of the top of the pack.

4. A method as claimed in claim 3, which comprises the brief application to the surface of the top of the pack of the correspondingly shaped undersurface of a hot body.

5. A method as claimed in claim 4, which comprises interposing between said hot body and the surface of the pack a thin foil which can be later easily peeled off.

6. A method as claimed in claim 2, in which the treatment for constricting the capillary ends and bonding the structural elements together consists in the application of a substance which firmly adheres to the structural elements.

7. A method as claimed in claim 6, which consists in the electrolytic application of a metal.

8. A method as claimed in claim 6, which comprises grinding down the filter surface after it has been subjected to the specified treatment until the capillary walls form a sharp cutting edge with the filter surface.

9. A method as claimed in claim 1, in which the pack is formed from a large number of metal, such as nickel, bands produced by the continuous electrolytic deposition of the metal on the peripheral surface of a slowly revolving roll provided with numerous small parallel groovings, flutings or corrugations.

10. A method of forming a filter having a smooth end face and a large number of closely adjacent substantially parallel elongated tubes each defining a capillary duct, said tubes having respective end portions tapering toward said end face, comprising the steps of bunching together in parallel and into a pack a large number of like tubes each defining a capillary duct and each having a length corresponding to many times the thickness of a filter with the ends of said tubes on top of said pack arranged substantially along a common surface; bonding said tubes together; subjecting the surface at the top of the pack to a treatment for constricting the openings of said capillary ducts; cutting off from the top of said pack a section of a thickness greater than the length of the constricted ends of said capillary ducts; and repeating the aforementioned steps until the entire pack is cut into sections for forming filters.

11. A method as claimed in claim 10 wherein the treatment of said surface at the top of the pack comprises the step of briefly applying to said surface the correspondingly shaped bottom face of a hot body.

12. A method as claimed in claim 11, comprising the further step of interposing between said hot body and said surface of said pack a thin foil which can be easily peeled off after the treatment of said tubes is completed.

13. A method of forming a filter having a smooth end face and a large number of closely adjacent substantially parallel elongated tubes each defining a capillary duct, said tubes having respective end portions tapering toward said end face, comprising the first step of bunching together in parallel and into a pack a large number of like tubes each defining a capillary duct and each having a length corresponding to many times the thickness of a filter with the ends of said tubes on top of said pack arranged substantially along a common surface; and subsequently a plurality of consecutive further steps carried out in any desired sequence, namely bonding said tubes together; subjecting the surface at the top of the pack to a treatment for constricting the openings of said capillary ducts; cutting off from the top of said pack a section of a thickness greater than the length of the constricted ends of said capillary ducts; and repeating the aforementioned steps until the entire pack is cut into sections for forming filters.

References Cited by the Examiner

UNITED STATES PATENTS

| | | | |
|---|---|---|---|
| 874,418 | 12/1907 | McEvoy | 210—498 X |
| 1,220,232 | 3/1917 | Jackson | 209—397 |
| 1,958,394 | 5/1934 | Renfrew et al. | 210—344 |
| 2,226,381 | 12/1940 | Norris | 210—498 X |
| 2,311,704 | 2/1943 | Simison | 29—411 |
| 2,322,428 | 6/1943 | Eickemeyer | 210—344 X |
| 2,433,271 | 12/1947 | Grant | 29—411 |
| 2,484,003 | 10/1949 | Simison | 210—483 X |
| 2,718,083 | 9/1955 | Gernsback | 210—422 |
| 2,752,731 | 7/1956 | Altosaar | 210—510 X |
| 2,781,917 | 2/1957 | Swallow | 210—344 |
| 3,018,891 | 1/1962 | Bergstrom | 209—397 |
| 3,087,293 | 4/1963 | Cassidy | 56—8 |

FOREIGN PATENTS

| | | |
|---|---|---|
| 327,464 | 12/1902 | France. |
| 1,038,201 | 5/1953 | France. |
| 930,424 | 7/1915 | Germany. |
| 126,921 | 5/1919 | Great Britain. |
| 11,864 | 2/1896 | Switzerland. |

WHITMORE A. WILTZ, *Primary Examiner.*

HERBERT L. MARTIN, REUBEN FRIEDMAN,
*Examiners.*